US010287171B2

(12) United States Patent
Geertsen (10) Patent No.: US 10,287,171 B2
(45) Date of Patent: May 14, 2019

(54) TUMBLING DEVICE FOR THE SEPARATION OF GRANULAR POLYSILICON AND POLYSILICON POWDER

(71) Applicant: REC Silicon Inc, Moses Lake, WA (US)

(72) Inventor: Robert J. Geertsen, Eltopia, WA (US)

(73) Assignee: REC Silicon Inc, Moses Lake, WA (US)

( * ) Notice: Subject to any disclaimer, the term of this patent is extended or adjusted under 35 U.S.C. 154(b) by 241 days.

(21) Appl. No.: 15/147,792

(22) Filed: May 5, 2016

(65) Prior Publication Data
US 2017/0320745 A1 Nov. 9, 2017

(51) Int. Cl.
| | |
|---|---|
| *B07B 1/22* | (2006.01) |
| *B07B 4/08* | (2006.01) |
| *C01B 33/02* | (2006.01) |
| *B07B 4/06* | (2006.01) |
| *B07B 7/02* | (2006.01) |

(52) U.S. Cl.
CPC ............... *C01B 33/02* (2013.01); *B07B 1/22* (2013.01); *B07B 4/06* (2013.01); *B07B 4/08* (2013.01); *B07B 7/02* (2013.01); *C01P 2004/32* (2013.01); *C01P 2004/60* (2013.01); *C01P 2006/80* (2013.01)

(58) Field of Classification Search
CPC .. B07B 7/04; B07B 7/08; B07B 7/083; B07B 7/10; B07B 4/06; B07B 4/02; C01B 33/02
USPC ............................. 209/19, 133, 268, 270, 718
See application file for complete search history.

(56) References Cited

U.S. PATENT DOCUMENTS

| | | | |
|---|---|---|---|
| 2,389,715 | A | 11/1945 | Beardsley |
| 2,465,346 | A | 3/1949 | Bodman |
| 2,523,259 | A | 9/1950 | Aber |
| 3,804,249 | A | 4/1974 | Gibbons et al. |
| 3,834,530 | A | 9/1974 | Bell |
| 3,957,629 | A | 5/1976 | Paterson |
| 3,957,630 | A | 5/1976 | Mooradian |
| 3,970,547 | A | 7/1976 | Theodore et al. |
| 4,029,572 | A | 6/1977 | Theodore et al. |

(Continued)

FOREIGN PATENT DOCUMENTS

| | | | |
|---|---|---|---|
| DE | 3040996 | 6/1982 | |
| EP | 1 818 111 A2 * | 8/2007 | ............... B07B 4/06 |

(Continued)

OTHER PUBLICATIONS

RASIRC, RainMaker® Humidification System (RHS), "Add Precise Amounts of Water Vapor to Atmospheric Processes," 2014 (3 pages).

(Continued)

*Primary Examiner* — Lee E Sanderson
*Assistant Examiner* — Michael C Romanowski
(74) *Attorney, Agent, or Firm* — Klarquist Sparkman, LLP (57) ABSTRACT

Methods and apparatus for separating polysilicon powder from a mixture of granular polysilicon and polysilicon powder are disclosed. The method includes tumbling the polysilicon material in a tumbling device while flowing humidified sweep gas through the tumbling device. Also disclosed are compositions including granulate polysilicon or polycrystalline silicon, in some examples, including a coating layer consisting essentially of water.

10 Claims, 7 Drawing Sheets

(56) References Cited

U.S. PATENT DOCUMENTS

| | | | |
|---|---|---|---|
| 4,039,434 A | 8/1977 | Croucher | |
| 4,043,901 A | 8/1977 | Gauld | |
| 4,070,202 A | 1/1978 | Nollet | |
| 4,107,034 A | 8/1978 | Paterson et al. | |
| 4,178,232 A | 12/1979 | Nollet | |
| 4,194,633 A | 3/1980 | Paterson et al. | |
| 4,210,527 A | 7/1980 | Paterson et al. | |
| 4,278,532 A * | 7/1981 | Birch | B07B 4/06 209/162 |
| 4,479,286 A | 10/1984 | Brown et al. | |
| 4,549,660 A | 10/1985 | Werling | |
| 4,634,060 A | 1/1987 | Riemann et al. | |
| 4,689,143 A | 8/1987 | Miers | |
| 4,784,840 A | 11/1988 | Gautreaux et al. | |
| 4,868,013 A | 9/1989 | Allen | |
| 4,883,687 A | 11/1989 | Gautreaux et al. | |
| 4,998,675 A | 3/1991 | Mohrman | |
| 5,022,982 A | 6/1991 | Greeley | |
| 5,056,924 A | 10/1991 | Christenson | |
| 5,139,762 A | 8/1992 | Flagella | |
| 5,158,182 A | 10/1992 | Fischer-Helwig et al. | |
| 5,178,457 A | 1/1993 | Helmy | |
| 5,195,640 A | 3/1993 | Seaverns | |
| 5,205,847 A | 4/1993 | Monthieth et al. | |
| 5,242,671 A | 9/1993 | Allen et al. | |
| 5,405,658 A | 4/1995 | Ibrahim et al. | |
| 5,593,042 A | 1/1997 | Keller | |
| 5,613,279 A | 3/1997 | Rhyne | |
| 5,762,689 A | 6/1998 | Hunziker | |
| 5,791,493 A | 8/1998 | Meyer | |
| 5,855,232 A | 1/1999 | Oda et al. | |
| 5,972,215 A | 10/1999 | Kammel | |
| 6,110,242 A | 8/2000 | Young | |
| 7,291,222 B2 | 11/2007 | Holder et al. | |
| 7,708,828 B2 | 5/2010 | Weidhaus et al. | |
| 8,075,692 B2 | 12/2011 | Osborne et al. | |
| 8,802,046 B2 | 8/2014 | Weckesser et al. | |
| 8,880,777 B2 | 11/2014 | Kim et al. | |
| 2003/0077128 A1 | 4/2003 | Williams et al. | |
| 2004/0079234 A1 | 4/2004 | Gorbulsky | |
| 2004/0151652 A1 | 8/2004 | Herold et al. | |
| 2005/0279277 A1 | 12/2005 | Holder et al. | |
| 2006/0105105 A1 | 5/2006 | Ibrahim et al. | |
| 2008/0187481 A1 | 8/2008 | Ibrahim et al. | |
| 2010/0236012 A1 | 9/2010 | Horne | |
| 2010/0294863 A1 * | 11/2010 | Schindler | B07B 9/02 241/24.1 |
| 2012/0052297 A1 | 3/2012 | Pech et al. | |
| 2013/0236367 A1 | 9/2013 | Bhusarapu et al. | |
| 2013/0295385 A1 | 11/2013 | Hertlein et al. | |
| 2013/0309524 A1 | 11/2013 | Vietz et al. | |
| 2014/0151259 A1 | 6/2014 | Wochner | |
| 2014/0262981 A1 | 9/2014 | Yun et al. | |

FOREIGN PATENT DOCUMENTS

| | | |
|---|---|---|
| EP | 1818111 | 8/2007 |
| GB | 1242055 | 8/1971 |
| JP | 2012101838 | 5/2012 |
| WO | WO 2006/007082 | 1/2006 |
| WO | WO 2006/062660 | 6/2006 |

OTHER PUBLICATIONS

International Search Report and Written Opinion issued by Korean Intellectual Property Office dated Jul. 27, 2015, for PCT/US2014/070599, 7 pages.

* cited by examiner

TUMBLING DEVICE FOR THE SEPARATION OF GRANULAR POLYSILICON AND POLYSILICON POWDER

FIELD

This disclosure concerns embodiments of an apparatus and method for separating polysilicon granules and powder.

BACKGROUND

As produced, e.g., by a fluid bed reactor, such as the reactors shown in U.S. Pat. Nos. 4,868,013; 5,139,762; and 8,075,692, granular polysilicon typically contains from 0.25% to 3% powder or dust by weight. The powder may render the product unsuitable for certain applications. For example, a product containing such levels of powder typically is unsuitable for use in producing monocrystalline silicon since the powder can cause a loss of structure, making single crystal growth impossible.

Current wet processes for removing dust have some disadvantages because there is complex, costly equipment to maintain, water and/or chemicals are required, and the processing may cause excessive oxidation of the polysilicon. Dry processes may avoid these disadvantages, but in at least some cases, the amount of powder or dust in the product may not be reduced to acceptable levels for monocrystalline silicon applications. Thus there is a demand for additional methods for producing granular polysilicon with reduced dust or powder levels.

SUMMARY

Disclosed herein are devices and methods for separating polysilicon granules and powder. One device for separating granular polysilicon and polysilicon powder includes a tumbler drum comprising a first end wall, a second end wall, a side wall that extends between the end walls and together with the end walls defines a chamber, wherein the side wall, the first end wall, the second end wall, or a combination thereof define a gas inlet and an outlet, with the gas inlet and the outlet being at spaced apart locations. In some examples, the side wall is configured to produce a primary transverse particle flow and a secondary transverse particle flow in the chamber by rotation of the tumbler drum. The device also includes a source of sweep gas and a water vapor source that is in fluid communication with the source of sweep gas. In some embodiments, the water vapor source is positioned between the source of sweep gas and the gas inlet, wherein the water vapor source is in fluid communication with both the source of sweep gas and the gas inlet and with a dust collection assembly fluidly connected to the outlet. In other embodiments, the water vapor source is in fluid communication with the flow path of the sweep gas. The device further includes a source of motive power operable to rotate the tumbler drum about an axis of rotation that extends longitudinally through the chamber. In some embodiments, the device also includes a water source in fluid communication with the water vapor source.

Disclosed herein are methods for separating polysilicon powder from a mixture of polysilicon and polysilicon powder including flowing sweep gas (such as humidified sweep gas) through a separating device (such as a tumbler drum, fluidized bed, or classifier), entraining polysilicon powder in the sweep gas and separating the sweep gas and entrained polysilicon powder from the other polysilicon material. Embodiments of a method for separating polysilicon powder from a mixture of polysilicon and polysilicon powder include (i) introducing a polysilicon material that is a mixture of granular polysilicon and polysilicon powder into a tumbler drum; (ii) rotating the tumbler drum about the axis of rotation at a rotational speed for a period of time; (iii) flowing humidified sweep gas through the chamber of the tumbler drum from a gas inlet to an outlet while the tumbling device is rotating, thereby entraining separated polysilicon powder in the humidified sweep gas; and (iv) separating the sweep gas and entrained polysilicon powder from the other polysilicon material, whereby at least a portion of the polysilicon powder is separated from the granular polysilicon. Tumbled polysilicon material is removed from the tumbling device, the tumbled polysilicon material comprising a reduced percentage by weight of polysilicon powder than the introduced polysilicon material. In some embodiments, the method further includes collecting the entrained separated polysilicon powder at a location external to the tumbling device.

Also disclosed are granulate polysilicon compositions including granulate polysilicon having an average particle diameter of 0.25 to 20 mm and unbound fine-powdered polysilicon having an average particle size of less than 50 $\mu$m, wherein the granulate polysilicon is substantially devoid of attached fine-powdered polysilicon having an average particle size of less than 50 $\mu$m. In other embodiments, disclosed are compositions including a composite particle of spheroidal shape with a core surrounded by a core coating layer, wherein the core is polycrystalline silicon having a purity of at least 99.999 wt % and a chlorine content of less than 10 ppm by weight and the core coating layer is a film consisting essentially of water, wherein the layer is about 10-50 Å thick.

The foregoing and other features and advantages of the disclosed technology will become more apparent from the following detailed description, which proceeds with reference to the accompanying figures.

DETAILED DESCRIPTION

Granular polysilicon is produced in a fluid bed reactor (FBR) by pyrolysis of a silicon-bearing gas such as monosilane. The conversion of silane to silicon occurs via homogeneous and heterogeneous reactions. The homogeneous reaction produces nano- to micron-sized silicon powder or dust, which will remain in the bed as free powder, attach to silicon granules, or elutriate and leave the FBR with effluent hydrogen gas. The heterogeneous reaction forms a solid silicon deposit on available surfaces, which primarily are surfaces of seed material (silicon particles onto which additional silicon is deposited), typically having a diameter in the largest dimension of 0.1-0.8 mm, such as 0.2-0.7 mm or 0.2-0.4 mm before deposition. This process encapsulates some of the powder and results in growth layers on the granules with some variation in density. On a microscopic scale, the surface of granular silicon has porosity that can trap dust. The surface also has microscopic attached features that can be broken away or otherwise removed when the granules are handled through a process known as attrition.

In the context of this disclosure, the terms "powder" and "dust" are used interchangeably, and refer to polycrystalline silicon particles having an average diameter less than 250 As used herein, "average diameter" means the mathematical average diameter of a plurality of powder or dust particles. When polysilicon is produced in a fluidized bed reactor, the average diameter of the powder particles may be considerably smaller than 250 µm, such as an average diameter less than 50 µm. Individual powder particles may have a diameter ranging from 40 nm to 250 µm, and more typically have a diameter ranging from 40 nm to 50 µm, or from 40 nm to 10 µm. Particle diameter can be determined by several methods, including laser diffraction (particles of submicron to millimeter diameter), dynamic image analysis (particles of 30 µm to 30 nm diameter), and/or mechanical screening (particles of 30 µm to more than 30 mm diameter).

The term "unbound fine-powdered polysilicon" or "free dust" refers to polycrystalline powder or dust that is not bound to polysilicon granules, for example, is not associated with polysilicon granules by electrostatic bonds or interactions, by van der Waals forces, or mechanically associated (such as loosely packed within a pore or crevice).

The term "attached fine-powdered polysilicon" or "surface-attached dust" refers to polycrystalline powder or dust that is bound (for example, associated by electrostatic bonds, by van der Waals forces, or mechanically associated) to polysilicon granules.

The terms "granular" or "granulate" polysilicon and "granules" refer to polysilicon particles having an average diameter of 0.25 to 20 mm, such as an average diameter of 0.25-10, 0.25-5, or 0.25 to 3.5 mm. As used herein, "average diameter" means the mathematical average diameter of a plurality of granules. Individual granules may have a diameter ranging from 0.1-30 mm, such as 0.1-20 mm, 0.1-10 mm, 0.1-5 mm, 0.1-3 mm, or 0.2-4 mm.

Surface roughness can be expressed as maximum height of the roughness profile (Rz), maximum profile peak height of the roughness profile (Rp), maximum profile valley depth of the roughness profile (Rv), mean height of the roughness profile elements (Rc), total height of the roughness profile (Rt), arithmetical mean deviation of the roughness profile (Ra), and root mean square deviation of the roughness profile (Rq or RMS). Methods of measuring surface roughness include contact analysis (for example, utilizing a stylus that traces across a surface) or non-contact analysis (for example, utilizing laser microscopy (focus detection), confocal microscopy, or interferometry).

When silicon is produced in an FBR process from a silicon source gas that is a perhydrosilane (compound or mixture of compounds that consists essentially of silicon and hydrogen), such as monosilane gas, some of the silicon produced typically will be in the form of silicon powder. Granulate polysilicon produced by an FBR process utilizing a halosilane source gas, such as trichlorosilane, does not typically result in any significant silicon powder accumulation due to a different chemistry inside the reactor. In particular, when silicon is produced from a perhydrosilane, the product typically is a mixture of silicon materials that includes granular polysilicon and silicon powder, with the silicon powder being from 0.25% to 3% of the mixture by weight; this quantity includes both free and surface-attached powder. The presence of silicon powder in association with the granular polysilicon is undesirable for users who melt and recrystallize the polysilicon in single-crystal growth processes due to the potential to cause loss of structure in the crystal. The powder also creates housekeeping and industrial hygiene difficulties, and potentially a combustible dust hazard at the manufacturing facility.

Methods for evaluating polysilicon powder/dust in a polysilicon product include visual analysis (qualitative or semi-quantitative), boil method, or ultrasonic method. In the boil method, a sample of granular polysilicon product is placed in a beaker of water and heated to the boiling point for a period of time. The water is subsequently cooled and filtered through a pre-weighed 0.2 µm filter. The filter is dried and weighed. The percent dust is calculated by dividing the weight of dust on the filter by the initial weight of the granular sample and multiplying by 100. In the ultrasonic method, a 10 gram sample of granular polysilicon product is placed in a beaker of water, which is then placed in an ultrasonic bath for a period of time. The water is then filtered and the percent dust calculated as described for the boil method. The ultrasonic method may produce higher dust measurements than the boil method, indicating that in addition to easily removed dust, some fragile microscopic structure is removed as well. Thus, in some examples, the boil method is used to quantify the amount of free dust, whereas the ultrasonic method is used to indicate total dust levels that include free dust and dust that would otherwise be produced via attrition during subsequent shipping and handling of the granular polysilicon product.

The term "relative humidity" refers to the ratio of the partial pressure of water vapor in an air-water mixture to the saturated vapor pressure of water at a given temperature. In some examples, relative humidity is expressed as a percentage. Relative humidity can be expressed by:

$$RH = \frac{e_w}{e_w^*} \times 100$$

where $e_w$ is the partial pressure of water vapor and $e^*_w$ is the saturated vapor pressure of water at a given temperature.

Humidity can be measured using devices such as hygrometers. In some examples, hygrometers measure parameters such as temperature, pressure, mass, or a mechanical or electrical change in a substance as moisture is absorbed. Electronic hygrometers measure temperature of condensation or changes in electrical capacitance or resistance to measure humidity. Hygrometers may require regular recalibration and may be subject to small temperature variations within the instrument. Thus, in some examples, relative humidity values described herein may vary by up to about ±3%, such as ±2%, ±1%, or ±0.5% (for example, about ±0-3%, ±1-2%, or ±0.5-1%).

I. Dedusting Devices

Disclosed herein are devices for dedusting polysilicon granules that include a tumbler drum (such as devices described in U.S. patent application Ser. No. 14/536,496, filed Nov. 7, 2014, which is incorporated herein by reference in its entirety) and components for introducing water vapor into the chamber of the tumbler drum. In some embodiments, the dedusting devices include a water vapor source (such as a humidifier), for example, a device for introducing water vapor into sweep gas that is introduced into the chamber of the tumbler drum. In other embodiments, the dedusting devices further include a water source (such as a water purification system), humidity sensor(s), valve(s), and/or instrumentation for controlling operation of the device, such as operation of the water vapor source and/or sweep gas flow.

Figure 1:
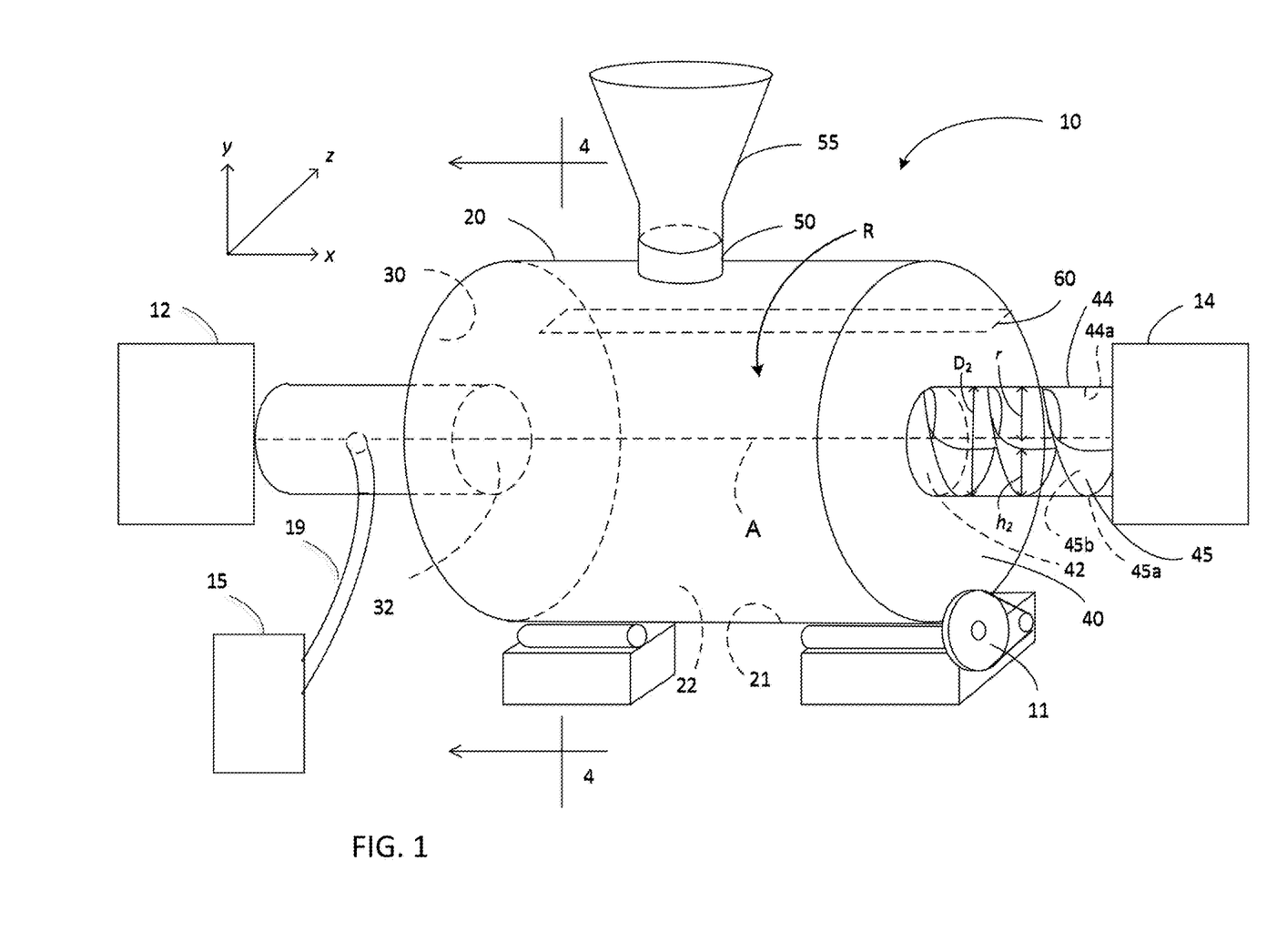
FIG. 1 is a schematic drawing of an exemplary first tumbling device for separating polysilicon powder from granular polysilicon.

An illustrated apparatus for separating granular polysilicon and polysilicon powder includes a tumbler drum and apparatus for rotating the tumbler drum, e.g., a motor. FIG. 1 depicts a tumbler drum 10 and a source of motive power 11 operable to rotate the tumbler drum. The tumbler drum 10 has a longitudinal axis of rotation A, a side wall 20, a first end wall 30 defining a gas inlet 32, and a second end wall 40 defining a gas outlet 42.

The side wall 20 of the exemplary tumbler drum 10 illustrated in FIG. 1 is tubular and together with end walls 30, 40 defines a chamber 22. The illustrated side wall 20 is the lateral surface of a right circular cylinder having a substantially constant circular transverse cross-sectional geometry along the longitudinal axis of rotation A. Other geometries are also contemplated. For example, side wall 20 could have an inner surface that defines a chamber having a boundary that is triangular, square, pentagonal, hexagonal, or higher order polygonal in cross-section. In any of the embodiments, the longitudinal axis of rotation A advantageously may be centered within the chamber 22 as shown in FIG. 1, or the axis of rotation A may be off-center.

In one embodiment, the side wall, first end wall, and second end wall collectively define the chamber of a v-mixer (e.g., a mixing device having a tumbler drum that defines a mixing chamber generally in the shape of the letter "V" and that is rotatable about a horizontal axis of rotation).

The exemplary tumbler drum 10 illustrated in FIG. 1 further includes a port 50 extending through the side wall 20. Port 50 may be used to introduce a polysilicon material that is a mixture of granular polysilicon and polysilicon powder into the chamber 22. Port 50 also may be used to remove tumbled polysilicon material from the chamber 22. Port 50 is closed during rotation of the tumbler drum 10. A feed hopper 55 may be removably or fixedly connected to port 50 to facilitate introduction of the polysilicon material into the chamber 22 and/or to facilitate removal of granular polysilicon from the chamber 22 after tumbling. Alternatively, the feed hopper may be integral with the side wall, e.g., the side wall and hopper are a unitary structure wherein the port extends through the side wall and into the hopper.

Figure 2A:
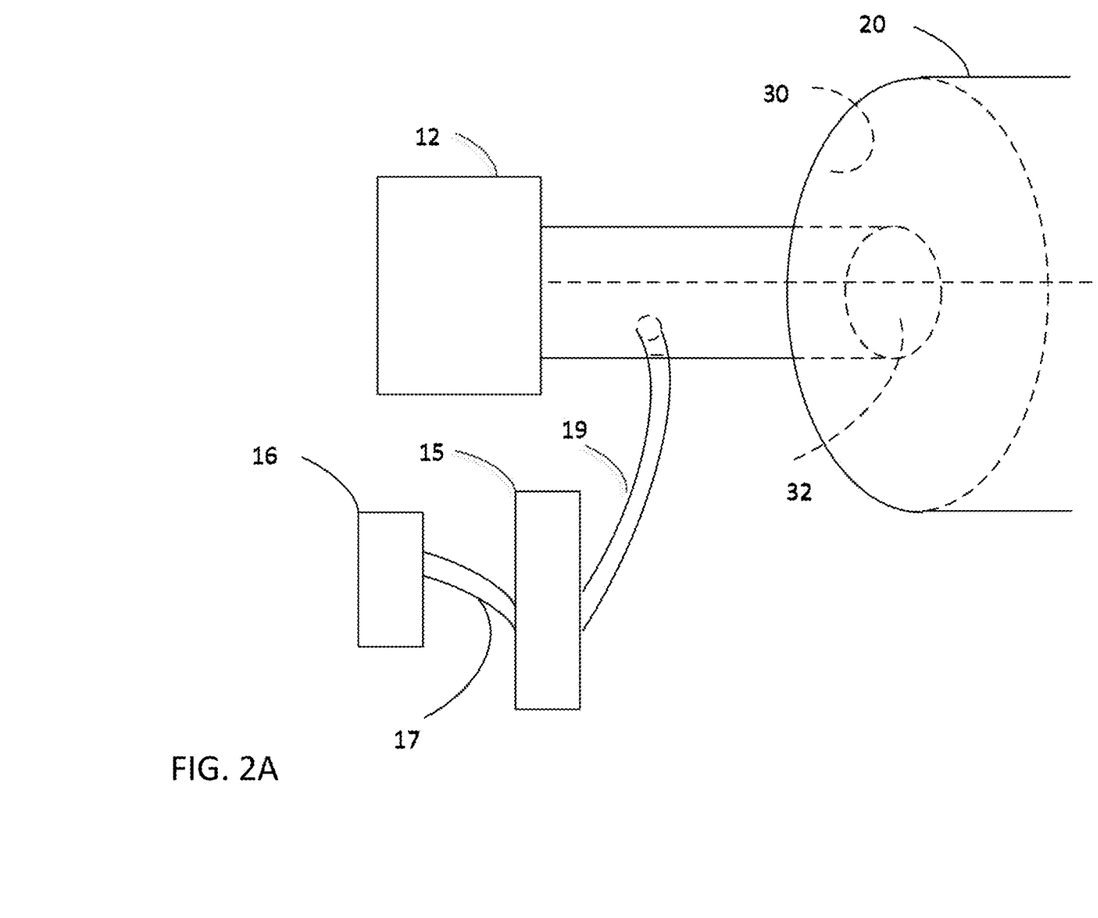
FIGS. 2A and 2B are partial schematic drawings of exemplary tumbling devices for separating polysilicon powder from granular polysilicon.

As illustrated in FIG. 1, a source of sweep gas 12 is connected to gas inlet 32 to provide a sweep gas flow (a flow path of the sweep gas) longitudinally through the chamber 22. In some embodiments, the flow path of the sweep gas includes the connector (such as a pipe or tube) between sweep gas source 12 and gas inlet 32. A filter (not shown), e.g., a HEPA filter, may be positioned between the sweep gas source 12 and gas inlet 32. A water vapor source 15 is in fluid communication with the flow path of the sweep gas. In some embodiments, for example as shown in FIG. 1 and FIG. 2A, water vapor source 15 is in fluid communication with the flow path of the sweep gas via a connector (such as a tube or pipe) 19.

Figure 2B:
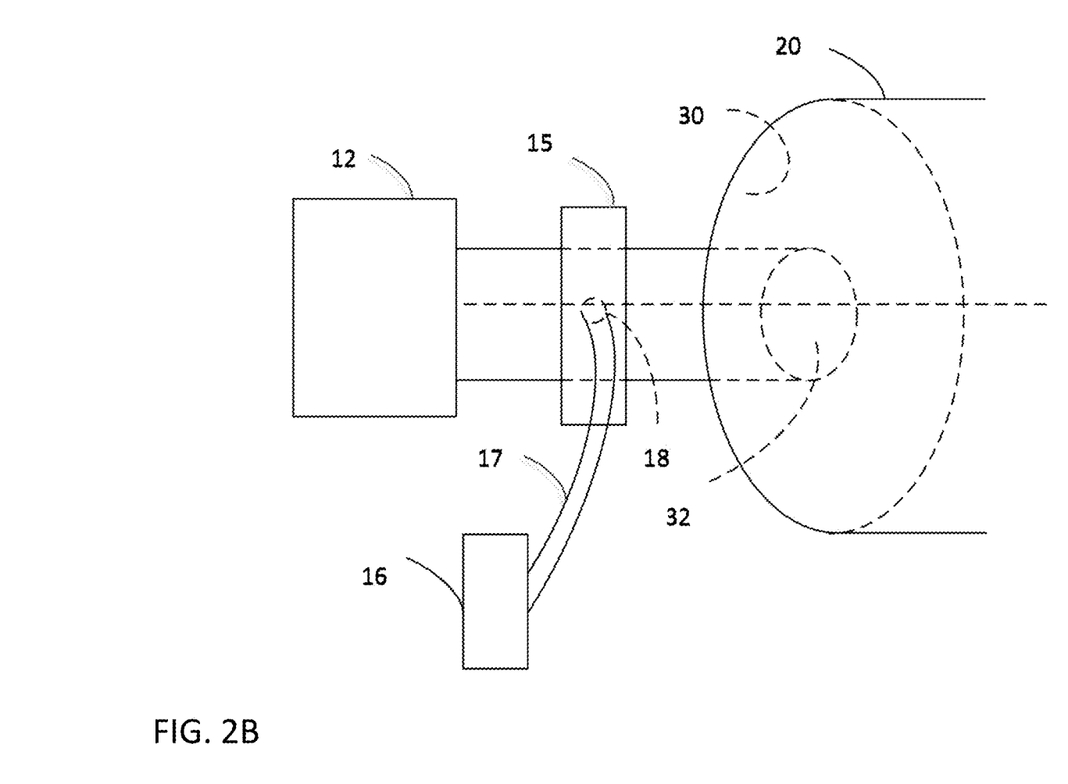

As illustrated in FIG. 2B, in other embodiments, the water vapor source 15 is positioned in the flow path of the sweep gas, between the sweep gas source 12 and gas inlet 32 (e.g., the water vapor source is fluidly connected to both the sweep gas source and the gas inlet). In embodiments including both a filter and a water vapor source (not shown), the components may be arranged with the filter between the sweep gas source 12 and the water vapor source 15. In other examples, the filter may be positioned between water vapor source 15 and gas inlet 32. In some examples, a dry sweep gas (such as nitrogen) is supplied to the water vapor source 15. The sweep gas gains water vapor and enters the gas inlet 32.

In some embodiments, the water vapor source is a humidifier. Humidifiers that can be utilized in the devices disclosed herein include vaporizers (e.g., direct liquid injection), bubble humidifiers, and membrane humidifiers. Different types of humidifiers are commercially available and suitable humidifiers can be selected by one of ordinary skill in the art. In some non-limiting embodiments, the dedusting devices include a membrane humidifier. Exemplary membrane humidifiers are available from Membrana (Charlotte, N.C.), PermSelect (Ann Arbor, Mich.), Perma Pure LLC (Toms River, N.J.), and RASIRC (San Diego, Calif.). In some particular examples, a RainMaker® humidification system (RASIRC) is included in the device, for example, between the sweep gas source 12 and the gas inlet 32 as shown in FIG. 2B.

In additional embodiments, the device also includes a water source 16 that is fluidly connected to the water vapor source 15. In some examples, the water source provides water to the water vapor source 15 through a connector, such as a tube 17 that extends between water source 16 and water inlet 18 of the water vapor source 15. The water source 16 may be any type of water source, including a municipal water supply, water tank(s), and/or a water purification system. In some examples, water source 16 provides purified water, such as distilled or deionized water. Thus, in some embodiments water source 16 includes a water purification system, such as a deionization system. In particular examples, water source 16 provides MΩ purity water. Water purification systems are commercially available and suitable systems can be selected by one of ordinary skill in the art. Exemplary deionized water systems are available from Rayne Water (San Diego, Calif.), Nalco PTS (Aston, Pa.), and Marlo Incorporated (Racine, Wis.). A non-limiting example of a water purification system that can be included in the device is an ELIX Essential Water Purification System (manufactured by EMD Millipore of Billerica, Mass.).

In some embodiments, the dedusting device optionally includes one or more sensors for detecting humidity (for example, absolute humidity and/or relative humidity) in the system. A humidity sensor may be placed at any point in the sweep gas flow path of the device or may be attached to a port at any point in the sweep gas flow path of the device. In some examples, a humidity sensor is included in the water vapor source. For example, a humidifier may include one or more sensors that monitor the dew point of the sweep gas as it passes through the humidifier. In particular examples, the humidifier also includes instrumentation that adjusts the flow of the sweep gas as needed to supply a humidified sweep gas of a selected relative humidity level. In other examples, one or more (such as two or more) moisture transmitters are located in the system, for example in the sweep gas flow path downstream of sweep gas source 12 and downstream of a filter (not shown) that is upstream of gas inlet 32 (for example, to prevent fouling of the sensor with dust). However, since the system is closed during operation, it is believed that the sensor(s) can be placed in or attached to a port at any part of the system, without substantially impacting the accuracy of measurement of the overall humidity of the sweep gas (for example, during operation).

An exemplary moisture sensor is DEWPRO MMR31 moisture transmitter (manufactured by GE Measurement and Control of Boston, Mass.).

The device may also include valves, tubing, or other components for providing and/or regulating water flow (for example, for water flow from the water source to the humidifier), sweep gas flow, and instrumentation for controlling operation of the water vapor source (e.g. a humidifier) in order to achieve a desired humidity level in the system during operation. The instrumentation may be computer-controlled or automated in some examples.

As shown in FIG. 1, a dust collection assembly 14, including a blower, a cyclone and a filter assembly, is operably connected to outlet 42 to collect dust removed from the granular polysilicon. In one embodiment (not shown), sweep gas is recirculated from the dust collection assembly to the gas inlet 32. In one embodiment, longitudinal axis A is horizontal. In another embodiment, longitudinal axis A is tilted such that outlet 42 is lower than inlet 32. Longitudinal axis A may be tilted at an angle of up to 30 degrees from horizontal.

In some embodiments, tumbler drum 10 includes one or more lifting vanes 60 (such as from 1-40, 1-20, 5-15, or 10-12 lifting vanes), for example attached to and extending inward from side wall 20. The number of vanes may depend, at least in part, on the inner circumference of the side wall 20 and/or the height of the lifting vanes. As the inner circumference of the side wall 20 increases, the number of lifting vanes may increase. The number of lifting vanes may vary inversely with the height of the lifting vanes, e.g., as the vane height increases, the number of vanes may decrease. The number of lifting vanes may also be determined by the vane geometry (e.g., the width of the lifting vane base and pitch angles) and the particle size of the granular polysilicon. For example, it is advantageous to space the lifting vanes no closer together than the maximum particle size of the granular polysilicon. Geometries and arrangements of lifting vanes are described in more detail in U.S. patent application Ser. No. 14/536,496.

Advantageously, a helical vane or vanes 45 may be located within the exhaust duct 44 of the tumbler drum 10. The exhaust duct 44 may have a cylindrical configuration. Desirably, the exhaust duct 44 has a circular cross-section and the helical vane 45 has an outer diameter D2 similar to an inner diameter (e.g., 2×r) of the exhaust duct 44. Any gap existing between an outer edge 45a of the helical vane 45 and an inner surface 44a of the exhaust duct 44 is smaller than an average diameter of the polysilicon granules. In some embodiments, the helical vane 45 has an outer diameter D2 that is only slightly less than the inner diameter (2×r) of the exhaust duct 44, so there is no gap between the outer edge 45a of the helical vane 45 and the inner surface 44a of the exhaust duct 44. Advantageously, the helical vane 45 will not include a central shaft. Instead, the helical vane 45 is best affixed to a surface within the exhaust duct 44. The helical vane 45 may be affixed to an interior surface of the exhaust duct 44 by any suitable means, including but not limited to welding, use of bolts, or adhesive bonding.

In the illustrated embodiment of FIG. 1, the drum 10 is rigidly attached to the exhaust duct 44 and the helical vane 45 is attached to the exhaust duct 44. As the tumbler drum 10 and the exhaust duct 44 rotate, the helical vane 45 also rotates. The helical vane 45 is configured such that dust and powder particles remain entrained in the sweep gas and flow past the vane 45 to the dust collection assembly 14. Larger particles separate from the sweep gas and are conveyed to the chamber 22 in a direction countercurrent to the sweep gas flow as the exhaust duct 44 and helical vane 45 rotate. The helical vane 45 has a height $h_2$, as measured from the inner surface 44a of the exhaust duct 44, that is sufficient to induce a swirling flow pattern and centrifugal force in the sweep gas with entrained polysilicon dust and granular particles flowing through the exhaust duct 44, the centrifugal force being effective to separate granular particles (e.g., particles having an average diameter greater than 0.25 μm) from the sweep gas and dust particles. However, the helical vane height $h_2$ is not great enough to induce excessive resistance to gas flow. In some embodiments, the helical vane height $h_2$ is from 0.25× to 0.75× a radius r of the exhaust duct 44.

In some arrangements, one or more intermediate supports (not shown) are spaced around the inner circumference of side wall 20. Intermediate supports extend longitudinally along the interior surface of side wall 20, advantageously generally in parallel to axis A. Intermediate supports may be positioned between adjacent lifting vanes 60. Advantageously, the intermediate supports are spaced substantially equidistant from one another around the inner circumference of side wall 20. When a single intermediate support is positioned between an adjacent pair of lifting vanes 60, the intermediate support may be located at a midpoint between the lifting vanes. Intermediate supports provide side wall 20 with additional strength and may reduce deformation of the side wall. Intermediate supports have a height less than the height of the lifting vanes 60, e.g., a height less than 0.05× the inner diameter of the chamber 22.

Initially as the sweep gas with entrained polysilicon dust and granular particles enter the exhaust duct 44 through outlet 42, flow will be across the helical vane 45. The helical vane 45 induces gas flow eddies. The sweep gas flow velocity rate upon entry to the exhaust duct is sufficiently low to allow some solids (e.g., granular particles having an average diameter greater than 250 μm) to disengage from the sweep gas flow stream. As the sweep gas travels farther along the exhaust duct 44, the angular velocity of the flow field increases and becomes more aligned with the turns of the helical vane 45. This rotating flow produces a centrifugal force that causes the larger particles to move outward towards the inner surface 44a of the exhaust duct 44. Due to the friction forces imposed on the gas from the wall surface 44a and the vane surface 45b, a boundary layer will form with the lowest velocities immediately next to these surfaces. When the larger particles reach these areas of lower velocity, they will no longer be entrained in the sweep gas current and their motion will be more influenced by gravity. These separated particles will accumulate along the lower portion of the exhaust duct 44 between turns of the helical vane 45. With the helical vane 45 rotating along with the chamber 22 and exhaust duct 44, and the helical pitch being such that as the particles climb the inner surface 44a of the rotating exhaust duct and fall down against the helical vane 45, they would be directed axially back into the chamber 22 against the sweep gas flow. The presence of the helical vane 45 may reduce product (e.g., polysilicon granules) loss to less than 2 wt % or less than 1 wt % of the weight of the initial charge placed into the drum.

In an independent embodiment, a screen (not shown) may be placed within cylindrical exhaust duct 44 to block solids from entering the dust collection assembly 14. For example, a 25-mesh to 60-mesh nylon screen may be placed within cylindrical exhaust duct 44. In such embodiments, a pulse of cleaning gas may be periodically applied to the downstream side of the screen to provide a reverse flow and clear accumulated particles from the upstream side of the screen.

Rotation of the tumbler drum 10 produces a tumbling or churning of the polysilicon material in the drum. Embodiments of the disclosed tumbler drum 10 create two different flow paths for the bed of granular silicon loaded within the drum: (1) a primary transverse flow, and (2) a secondary transverse flow. Primary transverse flow is flow created by side wall, interparticle, gravity, and centrifugal forces acting on the bed of granular silicon loaded within the drum. Secondary transverse flow is flow created by an interaction between a localized portion of the bed of granular silicon and the geometry of the of the side wall, e.g., lifting vanes 60 or transitions between facets of the side wall 20 itself when the side wall has a multi-sided faceted interior surface 21 such as when the side wall 20 has an inner surface 21 that, in transverse cross-section, is a triangle, a square, a pentagon, etc. Secondary transverse flow causes the affected material to be projected or lifted above the bed and dispensed over the bed or projected into the bed or an opposing portion of the side wall 20. These flows are dependent upon the drum cross-sectional area, rotational speed, bed depth, particle geometry (size, size distribution, shape, and roughness), lifting vanes (height, pitch angle, and quantity) the roughness of the drum's inner surface, and the kinetic coefficient of friction between the drum's inner surface and the polysilicon material. Primary transverse flow regimes include slipping, slumping, rolling, cascading, cataracting, and centrifuging regimes. These flow regimes are described in more detail in U.S. patent application Ser. No. 14/536,496.

Surface modification of the granular silicon processed in a tumbler drum occurs as a result of inter-particle collisions with both normal and tangential velocity components. The collision force component aligned in the normal direction produces compressive forces that fractures surface features and reduces the size of dust particles that are struck between the granules. The inertial forces produced in these collisions cause dust particles trapped within crevices and pores to be released. The collision force component aligned in the tangential direction cause surface features to be either sheared or fractured and also cause dust that is loosely attached to flat or convex features to be released through a wiping action. As discussed below, it is believed that formation of a water film on surfaces of the polysilicon granules and polysilicon powder in the chamber due to the presence of humidified sweep gas weakens the van der Waals forces (London forces) to permit separation of dust particles from the granular silicon, and facilitate entrainment of dust particles and their removal from the chamber of the tumbler drum in the sweep gas.

To maximize the amount of granular silicon material that is ground and polished in the tumbler drum, it is desired to establish a cascading flow regime, which produces increased particle velocities with all of the particles within the bed remaining in contact with each other and undergoing a significant amount of tangential collisions. The typical speed range to achieve cascading flow is somewhere between 55 to 75% of the critical speed. Thus, in some embodiments, the rotation speed is selected to provide a cascading flow regime. In some embodiments, a two-stage separation is performed with a first rotational speed at a lower end of the speed range (e.g., 55-75% or 55-65% of the critical speed) to remove free dust and a subsequent, increased rotational speed (e.g., 65-90%, or 70-85% of the critical speed) that approaches a cataracting flow regime to remove attached features that could otherwise be broken away or removed by attrition when the granules are handled, e.g., during packing and/or transport.

Additionally, as the tumbler drum 10 rotates, the one or more lifting vanes 60 carry a portion of the polysilicon material upward. As each lifting vane 60 rotates upward past a horizontal orientation, the polysilicon material carried by that lifting vane 60 falls downward. The sweep gas flowing through the chamber 22 entrains at least a portion of the falling polysilicon powder, which is carried out of the chamber 22 through outlet 42. The entrained polysilicon powder may be collected by any suitable means, such as by flowing the exiting gas and entrained powder through a filter. At sufficiently low sweep gas flow rates and/or tumbling speeds, granular polysilicon is not entrained by the flowing gas and remains in the chamber 22. However, lower gas flow rates and/or rotational speeds may be less effective at removing dust and polishing the polysilicon granules. Thus, sweep gas flow rate and/or rotational speed may be increased to improve efficacy. Any granular polysilicon swept into the cylindrical exhaust duct 44 by the higher gas flow rate and/or rotational speed is returned to the chamber 22 by rotation of helical vane 45, thereby minimizing granular product loss. After a period of time, rotation and sweep gas flow cease, and the chamber 22 is emptied via port 50. The polysilicon material removed from the chamber 22 includes a reduced percentage by weight of polysilicon powder than the material introduced into the chamber.

In one exemplary arrangement, a tumbler drum 10 has a capacity of 1000-4000 kg polysilicon (such as 1000-2000 kg, 1500-3000 kg, or 2500-4000 kg). The chamber 22 is partially defined by tumbler side wall 20 that has an inner surface that is a cylinder of circular cross-section with a uniform diameter of 150-200 cm and a length of 100-130 cm. The tumbler drum includes 1 to 20 lifting vanes 60, such as from 5-15 or 10-12 lifting vanes. If present, each lifting vane may have a height from 7.5 cm to 40 cm, such as from 15-30 cm. The tumbler drum also may include a plurality of intermediate supports (not shown). The tumbler drum 10 may be filled with a mixture of granular polysilicon and polysilicon powder to a depth that does not obstruct the gas inlet 32 and/or outlet 42. Thus, the tumbler drum may be filled to a depth of 50-80 cm with the mixture. In this arrangement, the tumbler drum may be operable to rotate at 5-30 rpm.

To reduce contamination of granular silicon and polysilicon powder due to contact with surfaces within the tumbling device, all of a portion of the inner surfaces of the side wall 20, the first end wall 30, the second end wall 40, or a combination thereof may comprise quartz, silicon carbide, silicon nitride, silicon, or a combination thereof. In one arrangement, the side wall 20, the first end wall 30, the second end wall 40, or a combination thereof is constructed of quartz, or lined with quartz.

In another embodiment, polysilicon contamination is reduced by coating at least a portion of the inner surface 21 of the side wall 20, the inner surface of first end wall 30, and/or the inner surface of second end wall 40 with polyurethane, polytetrafluoroethylene (PTFE, Teflon® (DuPont Co.)), or ethylene tetrafluoroethylene (ETFE, Tefzel® (DuPont Co.)). Advantageously, at least a portion of an outer surface of lifting vane (if present), intermediate support (if present), and/or helical vane 45 also may be coated with polyurethane, PTFE, or ETFE. As used herein, the term "polyurethane" may also include materials where the polymer backbone comprises polyureaurethanes or polyurethane-isocyanurate linkage. The polyurethane may be a microcellular elastomeric polyurethane.

The term "elastomeric" refers to a polymer with elastic properties, e.g., similar to vulcanized natural rubber. Thus, elastomeric polymers can be stretched, but retract to approximately their original length and geometry when released. The term "microcellular" generally refers to a foam structure having cell sizes ranging from 1-100 µm.

Microcellular materials typically appear solid on casual appearance with no discernible reticulate structure unless viewed under a high-powered microscope. With respect to elastomeric polyurethanes, the term "microcellular" typically is defined by density, such as an elastomeric polyurethane having a bulk density greater than 600 kg/m$^3$. Polyurethane of lower bulk density typically starts to acquire a reticulate form and is generally less suited for use as the protective coating described herein.

Microcellular elastomeric polyurethane suitable for use in the disclosed application is that having a bulk density of 1150 kg/m$^3$ or less, and a Shore Hardness of at least 65 A. In one embodiment the elastomeric polyurethane has a Shore Hardness of up to 90 A, such as up to 85 A; and from at least 70 A. Thus, the Shore Hardness may range from 65 A to 90 A, such as 70 A to 85 A. Additionally, the suitable elastomeric polyurethane will have a bulk density of from at least 600 kg/m$^3$, such as from at least 700 kg/m$^3$ and more preferably from at least 800 kg/m$^3$; and up to 1150 kg/m$^3$, such as up to 1100 kg/m$^3$ or up to 1050 kg/m$^3$. Hence, the bulk density may range from 600-1150 kg/m$^3$, such as 800-1150 kg/m$^3$, or 800-1100 kg/m$^3$. The bulk density of solid polyurethane is understood to be in the range of 1200-1250 kg/m$^3$. In one embodiment, the elastomeric polyurethane has a Shore Hardness of from 65 A to 90 A and a bulk density of from 800 to 1100 kg/m$^3$.

Elastomeric polyurethane can be either a thermoset or a thermoplastic polymer; this presently disclosed application is better suited to the use of thermoset polyurethane, particularly thermoset polyurethane based on polyester polyols. Microcellular elastomeric polyurethane having the above physical attributes is observed to be particularly robust, and withstands the abrasive environment and exposure to particulate granulate silicon eminently better than many other materials.

In some embodiments, a polyurethane coating is applied to an inwardly facing surface of wall 20. The polyurethane coating may be secured by any suitable means. In one embodiment, the polyurethane coating is cast in situ and adheres to side wall 20 as it is cast. In another embodiment, the polyurethane coating is secured to side wall 20 using a bonding material, e.g., an epoxy such as West System 105 Epoxy Resin® with 206 Slow Hardener® (West System Inc., Bay City, Mich.). In another embodiment, the polyurethane coating is secured to side wall 20 using double-sided adhesive tape, e.g., 3M™ VHB™ Tape 5952 (3M, St. Paul, Minn.). In still another embodiment, the polyurethane coating is secured by a lifting vane 60 and a bolt, and/or by an intermediate support and bolt.

The polyurethane coating on the inner surface of side wall 20 and/or the outer surfaces of the lifting vanes and/or intermediate supports typically will be present in an overall thickness of from at least 0.1, such as from at least 0.5, from at least 1.0, or from at least 3.0 millimeters; and up to a thickness of about 10, such as up to about 7, or up to about 6 millimeters. Thus, the polyurethane coating may have a thickness from 0.1-10 mm, such as 0.5-7 mm or 3-6 mm.

II. Methods of Separating Polysilicon Granules and Powder

Disclosed herein are methods of separating granular polysilicon and polysilicon powder utilizing humidified sweep gas and a separating device. The separating device may be a fluidized bed, a classifier, or a tumbler (such as the dedusting devices described in Section I herein).

In some embodiments, a polysilicon material that is a mixture of granular polysilicon and polysilicon powder is introduced into a chamber of a separating device. The system is energized (for example, by rotating a tumbler or introducing pressurized fluid) to disperse the granular polysilicon and the polysilicon powder. A flow of sweep gas (such as an inert gas) is introduced into the chamber via an inlet and the atmosphere in the chamber is humidified (for example, by flowing humidified sweep gas through the chamber). The loose polysilicon powder becomes airborne and forms a cloud within the chamber. The sweep gas flow rate is sufficiently high to entrain the loose polysilicon powder and carry it out of the chamber via an outlet (for example, at the opposite end of the chamber from the inlet); however, the sweep gas flow rate is not sufficient to entrain polysilicon granules.

The methods are described with reference to using a tumbler device disclosed herein. However, one of ordinary skill in the art can apply these methods to other separating devices, such as a fluidized bed or classifier. In one embodiment, a polysilicon material that is a mixture of granular polysilicon and polysilicon powder is introduced into the chamber of the tumbler drum. The tumbler drum 10 is rotated at any suitable speed, such as a speed from 1-100 rpm, 2-75 rpm, 5-50 rpm, 10-40 rpm or 20-30 rpm. The speed is selected to effectively separate at least some of the powder from the polysilicon granules as portions of the mixture are lifted—e.g., by one or more lifting vanes—and fall as the tumbler drum rotates. A person of ordinary skill in the art understands that the selected speed may depend at least in part on the size of the tumbler drum and/or the mass of the mixture within the tumbler drum.

A flow of sweep gas is introduced into the chamber via a gas inlet, for example at one end of the chamber. The sweep gas may be air or an inert gas (e.g., argon, nitrogen, helium). In some examples, the sweep gas is nitrogen. As the tumbler drum rotates, loose polysilicon powder becomes airborne and forms a cloud within the chamber. The sweep gas flow rate is sufficiently high to entrain the loose polysilicon powder and carry it out of the chamber via an outlet (for example, at the opposite end of the chamber from the inlet); however, the sweep gas flow rate is not sufficient to entrain polysilicon granules. Advantageously, when the sweep gas is air, a sufficient gas flow rate is maintained to keep the airborne dust concentration within the chamber less than the minimum explosible concentration (MEC). A lower sweep gas flow rate can be used when the sweep gas is inert (e.g., nitrogen, argon, helium). Suitable sweep gas axial flow velocities may range from 20 cm/sec to 40 cm/sec (0.7 ft/sec to 1.3 ft/sec) in the chamber and from 200 cm/sec to 325 cm/sec (6.6 ft/sec to 10.7 ft/sec) in an exhaust duct connected to the outlet.

In the methods disclosed herein, the atmosphere in the tumbler drum is humidified (for example, by flowing humidified sweep gas through the tumbler drum). Without being bound by theory, it is believed that maintaining a relative humidity in the chamber results in formation of a water film on surfaces of the polysilicon granules and polysilicon powder in the chamber. Formation of a water film of sufficient thickness is believed to weaken the van der Waals forces (London forces) to permit separation of dust particles from the granular silicon, and facilitate entrainment of dust particles and their removal from the chamber in the sweep gas.

Thus, in some embodiments, the sweep gas flowing through the tumbler drum chamber from the gas inlet to the gas outlet is humidified prior to its introduction into the chamber through the gas inlet. In some examples, the sweep gas is humidified by injecting water (such as purified, for example, deionized water) in the sweep gas flow, for example by manually adding water to a filter between the sweep gas source and the gas inlet or a fitting of the filter. As the sweep gas flows through the filter, water vapor is picked up by the sweep gas. In other examples, the sweep gas is humidified by a humidifier placed between the sweep gas source and the gas inlet. In a specific, non-limiting example, the sweep gas is humidified using a RainMaker® humidification system (RASIRC, San Diego, Calif.). In still further examples, the sweep gas is humidified by adding water vapor to the sweep gas flow downstream of the sweep gas source and upstream of the gas inlet.

In some examples, the sweep gas in the chamber is humidified to a relative humidity of at least about 2% (for example, at least about 3%, at least about 4%, at least about 5%, at least about 10%, at least about 15%, or more). In some examples, the RH is about 3-22% (such as about 3-6%, about 5-10%, about 6-12%, about 8-15%, about 12-20%, about 16-22%, or about 10-22%). In other examples, the RH is about 10-90% (such as about 10-30%, 25-50%, 40-75%, or 60-90%). However, even higher levels of RH can potentially be used so long as the temperature is maintained above the dew point or humidity is reduced prior to allowing temperature to drop below the initial dew point in order to avoid condensation in the system. The RH may be substantially constant during flow of sweep gas through the chamber during the course of operation (for example, ±1% RH from the start of operation to the end of operation). However, the RH may increase and/or decrease during flow of sweep gas through the chamber during the course of operation by 2% RH or more (such as ±2%, 3%, 4%, 5%, or more). In particular examples, the RH may increase and/or decrease during the course of operation, so long as the RH is maintained at or above a selected point, such as 5%, 10%, 15%, or 20%. In some examples, RH may be decreased when anticipating cooling of the system below the dew point.

In one embodiment, the tumbling process is a batch process wherein a quantity of polysilicon material is introduced into the chamber via a port. After processing as described above, the tumbled polysilicon material is removed from the chamber (e.g., through the port), and another quantity of polysilicon material is introduced into the chamber.

Following the tumbling process, polysilicon material comprising granular polysilicon and a reduced percentage by weight of polysilicon powder is removed from the tumbling device. The initial polysilicon material may comprise from 0.25% to 3% powder by weight. In some embodiments, the tumbled polysilicon material comprises less than 0.1% powder, such as less than 0.05% powder, less than 0.02% powder, less than 0.015% powder, less than 0.01% powder, or even less than 0.001% powder by weight. In some embodiments, the granular polysilicon is dried after removal from the tumbler drum.

III. Granulate Polysilicon Compositions

Disclosed herein are granulate polysilicon compositions. In some embodiments, the compositions include a first component, being granulate polysilicon having an average particle diameter of 0.25 to 20 mm and a second component, being unbound fine-powdered polysilicon having an average particle size of less than 50 μm. In some examples, the average particle diameter of the first component is 0.25 to 20 mm (such as 0.25-10, 0.25-5, or 0.25 to 3.5 mm). The first component is present in the composition as at least 99.9 wt % (such as 99.99 wt % or 99.999 wt %) of the composition and individual granules of the first component have a diameter ranging from 0.1-30 mm, such as 0.1-20 mm, 0.1-10 mm, 0.1-5 mm, 0.1-3 mm, or 0.2-4 mm. The second component is present in the composition in an amount of less than 0.02 wt % (such as less than 0.015 wt %, 0.01 wt %, 0.005 wt %, 0.001 wt %, or less) of the composition and individual powder particles may have a diameter ranging from 40 nm to 250 μm (for example, a diameter ranging from 40 nm to 50 μm or from 40 nm to 10 μm). In particular embodiments, the surface of the granulate polysilicon is substantially devoid of any attached fine-powdered polysilicon having an average particle size of less than 50 μm. Additionally, both the first component and the second component have a chlorine content of less than 10 ppm by weight (such as less than 5 ppm by weight or less than 2 ppm by weight).

In additional embodiments, the first component of the composition has a reduced surface roughness compared to previously available granulate polysilicon compositions. In some examples, the surface roughness $R_a$ of the granulate polysilicon (first component) is less than 1 μm (such as less than 900 nm, less than 800 nm, less than 700 nm, less than 600 nm, less than 500 nm, less than 400 nm, less than 300 nm, less than 200 nm, less than 150 nm, less than 100 nm, or less than 50 nm).

In still further embodiments, the composition includes a film of water on the surface of the granulate polysilicon and/or the fine-powdered polysilicon. In some examples, the film of water on the surface of the granulate polysilicon or the fine-powdered polysilicon is at least about 5 Å, at least about 10 Å, at least about 15 Å, at least about 20 Å, at least about 25 Å, at least about 30 Å, at least about 35 Å, at least about 40 Å, at least about 45 Å, at least about 50 Å, at least about 60 Å, at least about 70 Å, at least about 80 Å, at least about 90 Å, or at least about 100 Å thick (such as about 5-100 Å, 5-30 Å, 5-25 Å, 5-20 Å, 10-15 Å, 10-50 Å, 20-40 Å, 25-45 Å, 30-80 Å, 50-75 Å, or 70-100 Å thick). In some examples, the film of water is a continuous layer or substantially continuous layer over the surface of the granulate polysilicon and/or over the surface of the fine-powdered polysilicon. A substantially continuous water film is one that has only minor interruptions or gaps or is even free of detectable interruptions or gaps. Thus, in some examples, the film of water on the surface of the granulate polysilicon or on the surface of the fine-powdered polysilicon is free of detectable gaps or interruptions. In some examples, the water film is 5-100 Å thick and is continuous (for example, over all surfaces) but there can be local variances of the thickness of the film, for example, depending on local topography of the particle surface. In other examples the water film is of a uniform thickness over the surface of the granulate polysilicon and/or over the surface of the fine-powdered polysilicon.

At least a portion of the water may interact with the surface by physisorption (also referred to as physical adsorption) and/or chemisorption (also referred to as chemical adsorption). Physisorption refers to non-covalent or non-ionic interactions between water and the granulate polysilicon, for example interactions via van der Waals forces. Chemisorption refers to interactions between water and the granulate polysilicon by covalent or ionic bonds. In particular examples, the water on the surface of the granulate polysilicon and/or the fine-powdered polysilicon is predominantly physisorbed water (for example, at least 80%, 85%, 90%, 95%, 99%, or more of the water is physisorbed). In other examples, all or substantially all of the water on the surface of the granulate polysilicon and/or the fine-powdered polysilicon is physisorbed water. As discussed above, formation of a water film during dedusting of the polysilicon granules is believed to weaken interactions between attached fine-powdered polysilicon and the polysilicon granules, thereby facilitating release of attached polysilicon dust.

In additional embodiments, the granulate polysilicon composition includes a composite particle having an essentially spheroid shape and having a core that is surrounded by a core coating layer. The core of the composition includes polycrystalline silicon having a purity of at least 99.9 wt % (such as 99.99 wt % or 99.999 wt %) and a chlorine content of less than 10 ppm by weight (such as less than 5 ppm by weight or less than 2 ppm by weight). The coating layer of the composition is a film that consists essentially of water. In some examples, the film of water is about 5-100 Å thick (for example, 5-30 Å, 5-25 Å, 5-20 Å, 10-15 Å, 10-50 Å, 20-40 Å, 25-45 Å, 40-60 Å, 30-80 Å, 50-75 Å, or 70-100 Å thick). At least some of the water film is physisorbed water. In particular embodiments, the composite particle is present in the composition in at least 99.9 wt % (such as at least 99.99 wt % or 99.999 wt %) based on the total weight of the composition.

In particular embodiments, the core of the composite particle has an average diameter of from 0.25 mm to 20 mm (such as 0.25-10, 0.25-5, or 0.25 to 3.5 mm). In other embodiments, the core has an average diameter from 0.001 mm to less than 0.25 mm (such as 0.001-0.05 mm, 0.01-0.1 mm, 0.025-0.1 mm, or 0.1-0.2 mm). In still further embodiments, the core has an average diameter of less than 50 μm (for example, from 40 nm to 50 μm or from 40 nm to 10 μm). In some examples, the core particle has an average diameter of from 0.25 mm to 20 mm and is substantially devoid of attached fine-powdered polycrystalline silicon having an average particle size of less than 50 μm.

In some embodiments, the composition includes a bimodal size distribution of core particles, with a first population of core particles having an average diameter of from 0.25 mm to 20 mm and wherein the first population of core particles is present in the composition in at least 99.9 wt % based on the total weight of the core particles and a second population of core particles having an average diameter of less than 50 μm and wherein the second population of core particles is present in the composition in an amount of less than 0.02 wt % (such as less than 0.015 wt % or less than 0.01 wt %) of the total weight of the core particles. In some examples, the individual core particles of the first population have a diameter ranging from 0.1-30 mm (for example, 0.1-5 mm or 0.2-4 mm) and the individual core particles of the second population have a diameter ranging from 40 nm to 250 μm (for example 40 nm to 50 μm or 40 nm to 10 μm).

In some examples, the granulate polysilicon compositions are produced using the system and/or methods described herein.

Also disclosed herein are packages of the granulate polysilicon composition (for example, for shipment or storage) having a wall having an inner surface that defines a cavity and a volume of the granulate polysilicon composition contained within the cavity. In some embodiments, the wall is constructed of a non-contaminating material or the wall is lined or coated with a protective layer of a non-contaminating material. In some embodiments, the package is at least partially constructed of metal and has an inner metal surface. In other embodiments, the package is at least partially constructed of a non-contaminating material. The non-contaminating (or protective) material can reduce or eliminate contamination of the granulate polysilicon composition (for example, metal contamination if the inner surface of the wall is metal).

Figure 5:
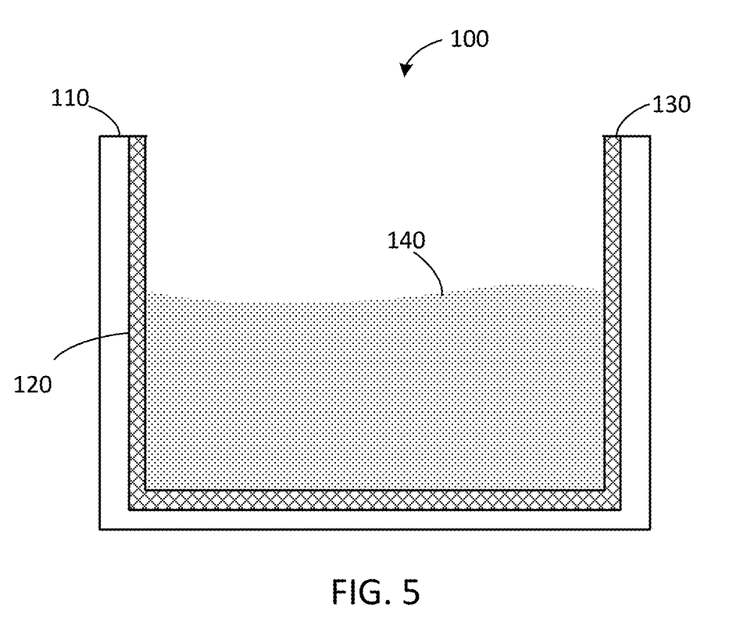
FIG. 5 is a schematic cross-sectional view of a lined container holding a granulate polysilicon composition.

FIG. 5 is a cross-sectional schematic diagram of an exemplary package 100 including at least one wall 110 having an inner surface 120 and a protective lining or coating 130 covering one or more of inner surface 120. Granulate polysilicon composition 140 is located within the wall 110 and is in contact with the protective liner 130. One of ordinary skill in the art will recognize that the package holding the granulate polysilicon composition can be of any suitable size and shape, and may include one or more additional openings, for example for loading or unloading the composition.

The non-contaminating liner or coating on the inner surface of the package typically will be present in an overall thickness of from at least 0.1, such as from at least 0.5, from at least 1.0, or from at least 3.0 millimeters; and up to a thickness of about 10, such as up to about 7, or up to about 6 millimeters. Thus, embodiments of the disclosed protective liner may have a thickness from 0.1-15 mm, such as 0.5-7 mm, 1-10 mm, 3-6 mm, or 5-13 mm. The protective liner can be a plastic laminate structure comprising an outer polyurethane lamella being in contact with the silicon. In other examples, the protective liner can be polyethylene, PTFE, or ETFE. However, in one embodiment, it is contemplated that the majority or the entirety of the protective liner be the elastomeric microcellular polyurethane. In some non-limiting examples, the protective liner or coating is microcellular elastomeric polyurethane, thereby reducing or eliminating contamination of the granulate polysilicon composition.

Also disclosed are packages of the granulate polysilicon composition (for example, for shipment or storage) such as a flexible bag containing the granulate polysilicon composition. In some embodiments, the bag is constructed of a non-contaminating material. The non-contaminating material can reduce or eliminate contamination of the granulate polysilicon composition, for example, from the packaging material. In some examples, the flexible bag can be made of polyethylene (such as low density PE or linear low density PE). Other suitable materials for the flexible bag include polyethylene terephthalate (PET) or polypropylene. Additional materials can be selected from those known in the art, including those described in US Pat. Publ. Nos. 2014/0151259 and 2013/0309524 and JP Pat. No. 551408, all of which are incorporated herein by reference in their entirety.

IV. Examples

Effect of Humidity on Dust Removal

Figure 3:
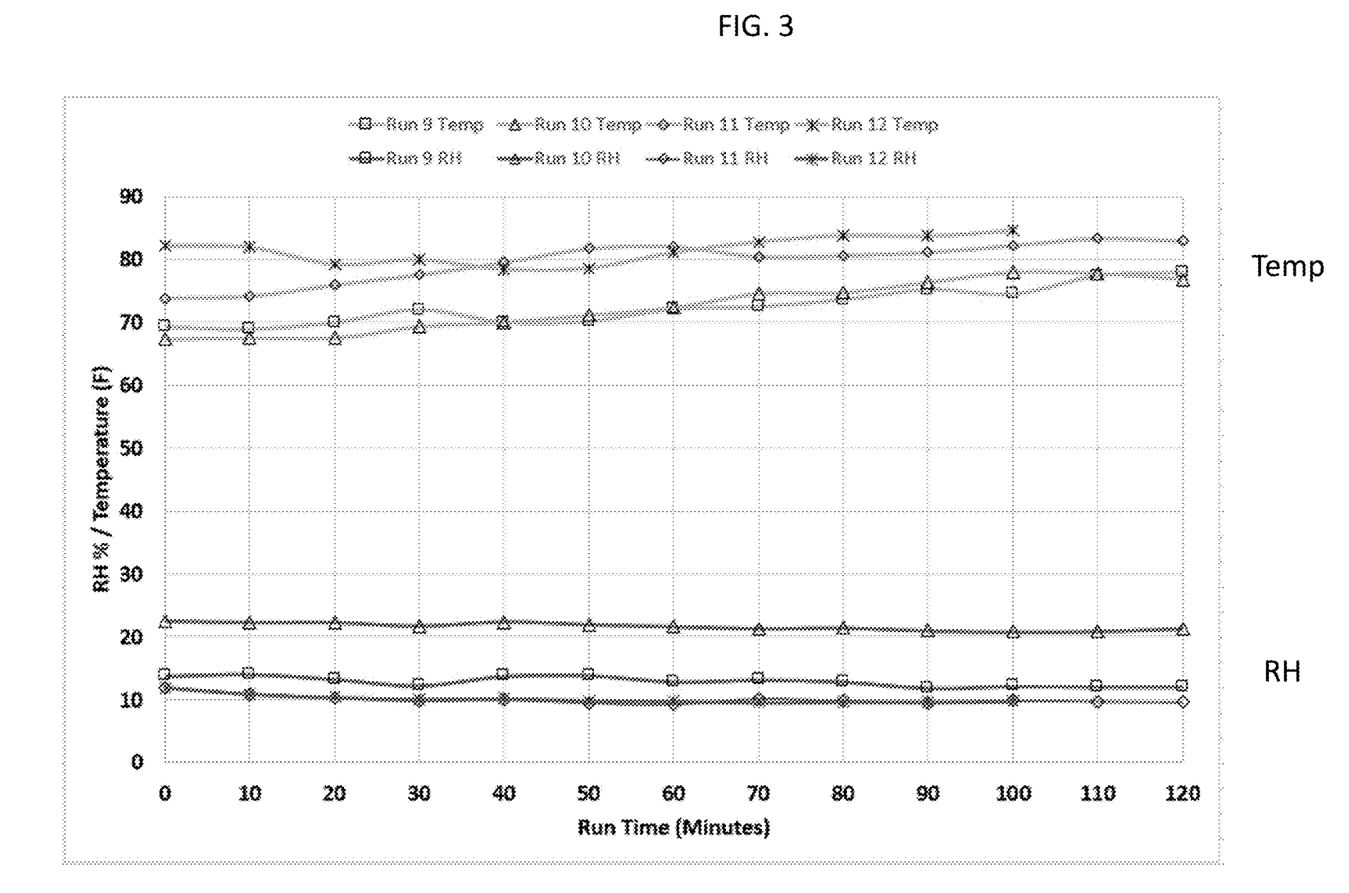
FIG. 3 is a graph showing temperature and RH during several runs (Runs 9-12, Table 1) of the dedusting process.

Granular polysilicon produced in a fluid bed reactor (e.g., as described in U.S. Pat. No. 8,075,692) was evaluated after tumbling in a device for separating granular polysilicon and polysilicon powder as described herein. Dust removal was evaluated by visual analysis and categorized as poor, good, or excellent (Table 1). Approximate dust amounts are about >0.04% for poor results, 0.01-0.02% for good results, and <0.01% for excellent results. Temperature and RH of runs 9-12 are shown in FIG. 3. Except for run 8b (which was measured at the end of the run), all other runs were continuously measured and manually recorded at various intervals with a Model 485B Thermo-Hygrometer (manufactured by Dwyer Instruments of Michigan City, Ind.) through a threaded nozzle in the exhaust side of the HEPA filter housing (downstream of the sweep gas source and upstream of the gas inlet).

TABLE 1

Dust removal conditions

| Run | Batch Size (kg) | Open to atmosphere prior to run | Notes | Dust Removal |
|---|---|---|---|---|
| 5b | 1600 | days | | Excellent |
| 6 | 1600 | not opened | | Good |
| 7 | 1700 | not opened | | Poor |
| 8a | 1600 | not opened | | Poor |
| 8b | 1600 | 2 hours | Established 5% RH with atmospheric moisture | Poor |
| 8c | 1600 | | Added DI water to maintain 10-12% RH | Excellent |
| 9 | 1600 | | Added DI water to HEPA housing to maintain 12-14% RH | Excellent |
| 10 | 1600 | | Added DI water to HEPA housing to maintain 20-22% RH | Excellent |
| 11 | 1600 | | Added DI water to HEPA housing to maintain 10-12% RH | Excellent |
| 12 | 1600 | | Added DI water to HEPA housing to maintain 10-12% RH | Excellent |

Run 5b was conducted after the system was open to ambient humid atmosphere for an extended time. Specifically, in the three days prior to run 5b, the system was opened for a duct modification in the morning of the first day (average temperature 53° F. and average RH 53%), was open to atmosphere all day on the second day (average temperature 48° F. and average RH 63%), and the system reassembly was completed in the afternoon of the third day (average temperature 49° F. and average RH 58%). Run 5b was carried out on the next day. It is believed that atmospheric humidity provided a water film on all surfaces in the tumbler and sweep gas system, and also absorbed into both of the filters' media and dust embedded in them, which is believed to have provided a small reservoir of water. Prior to starting this run, to remove oxygen, the system was purged with dry nitrogen, but due to the availability of this reservoir of water, the resulting system humidity was likely high enough to permit a very effective cleaning process throughout Run 5b to achieve excellent results.

This water reservoir presumably became depleted over the course of runs 6, 7, and 8a as each batch of granular silicon and corresponding dust were added with each particle's surface gaining a water film that was lost to the dust collection drums and draining processed granular to the flexible intermediate bulk container loading system. In addition, moisture was lost with the sweep gas that leaks between the tumbler and fixed duct seals. This was replaced with a very dry continuous nitrogen purge supplied to the system. It is believed that run 6 may have started with some humidity which allowed it to achieve good results, but over the course of the run, the humidity likely dropped low enough to prevent complete removal of dust. Since no new moisture was added to the system, runs 7 and 8a were performed at low humidity, which is believed to have caused their poor results.

Figure 4A:
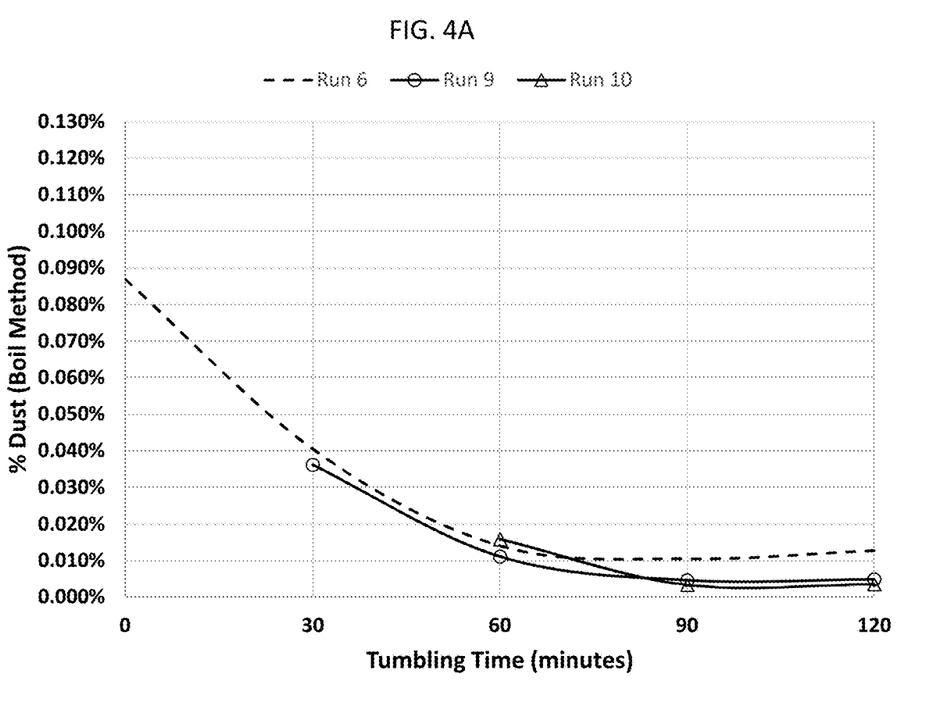
FIGS. 4A and 4B are graphs showing dust removal in various runs over time. The amount of dust was determined by the boil method.
Figure 4B:
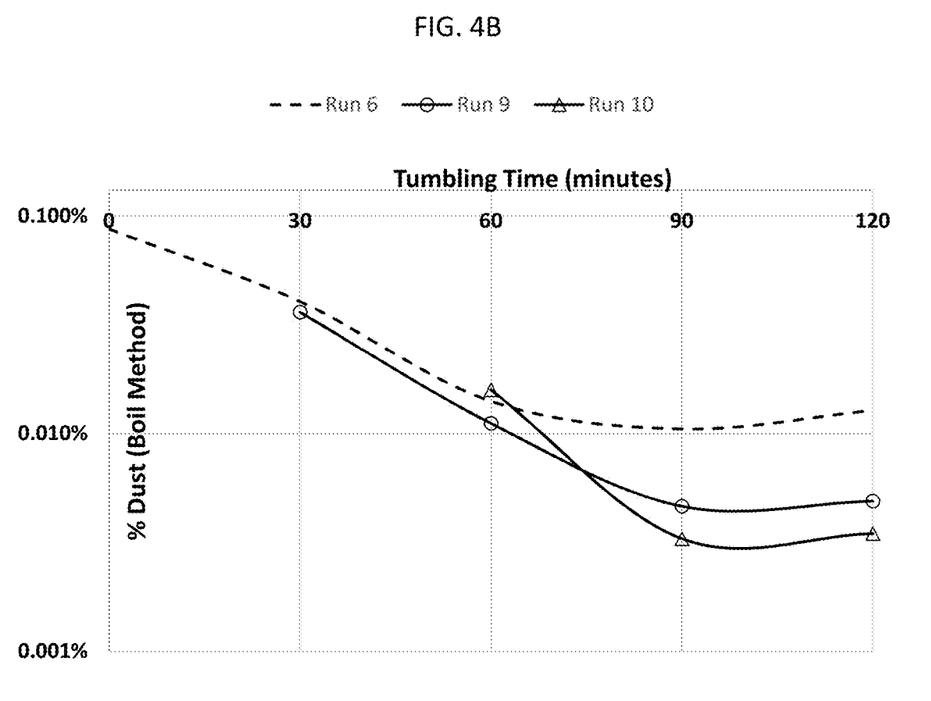

Run 8b was attempted after exposing the system to ambient humidity for just a few hours by opening the HEPA filter housing. Upon completion of this run, the first measurements of humidity were made. While evaluating the continued poor results of run 8b, despite introducing some humidity, it was speculated that the 5% RH present at the end of this run was potentially lower than that of run 5b and was insufficient to achieve the desired results. Consequently, prior to the start of run 8c, a more aggressive active humidity control was established. This was achieved by adding DI water to the HEPA filter housing (located downstream of the sweep gas source and upstream of the gas inlet) in runs 8c-12 to maintain the shown RH levels. These runs all provided excellent dust removal by visual examination and by the boil method (FIGS. 4A and 4B). Excellent results have been obtained on more than 50 subsequent runs utilizing >10% RH.

In view of the many possible embodiments to which the principles of the disclosure may be applied, it should be recognized that the illustrated embodiments are only examples and should not be taken as limiting the scope of the invention. Rather, the scope of the invention is defined by the following claims. We therefore claim as our invention all that comes within the scope and spirit of these claims.

I claim:

1. A tumbling device for separating granular polysilicon and polysilicon powder, the tumbling device comprising:
   a tumbler drum comprising:
     a first end wall,
     a second end wall,
     a side wall that extends between the end walls and together with the end walls defines a chamber, and
     a port extending through the side wall, the port being configured to provide access to the chamber for introducing a polysilicon material into the chamber and for removing the polysilicon material from the chamber,
     the side wall, the first end wall, the second end wall, or a combination thereof defining a gas inlet and a gas outlet, with the gas inlet and the gas outlet being at spaced apart locations;
   a source of sweep gas in fluid communication with the gas inlet;
   a water vapor source that is in fluid communication with the source of sweep gas; and
   a source of motive power operable to rotate the tumbler drum about an axis of rotation that extends longitudinally through the chamber.

2. The tumbling device of claim 1, wherein the water vapor source is positioned between the source of sweep gas and the gas inlet, the water vapor source being in fluid communication with the source of sweep gas and the gas inlet.

3. The tumbling device of claim 1, further comprising a dust collection assembly in fluid communication with the outlet.

4. A tumbling device for separating granular polysilicon and polysilicon powder, the tumbling device comprising:
   a tumbler drum comprising:
     a first end wall,
     a second end wall,
     a side wall that extends between the end walls and together with the end walls defines a chamber, and
     the side wall, the first end wall, the second end wall, or a combination thereof defining a gas inlet and a gas outlet, with the gas inlet and the gas outlet being at spaced apart locations, wherein the gas inlet extends through the first end wall and the gas outlet extends through the second end wall;

a source of sweep gas in fluid communication with the inlet;

a water vapor source that is in fluid communication with the source of sweep gas;

a source of motive power operable to rotate the tumbler drum about an axis of rotation that extends longitudinally through the chamber; and a dust collection assembly in fluid communication with the outlet, an exhaust duct positioned between the dust collection assembly and the outlet, the exhaust duct being in fluid communication with the dust collection assembly and the outlet; and one or more helical vanes located within the exhaust duct.

5. The tumbling device of claim 1, wherein:

the water vapor source has a water inlet; and a water source is fluidly connected to the water inlet of the water vapor source.

6. The tumbling device of claim 1, wherein the side wall has a generally cylindrical interior surface, and the tumbler drum further comprises one or more lifting vanes attached to the side wall, spaced apart from one another and extending longitudinally along the interior surface of the side wall.

7. A method for separating polysilicon powder from a mixture of granular polysilicon and polysilicon powder, comprising:

introducing a polysilicon material that is a mixture of granular polysilicon and polysilicon powder into the chamber of a tumbling device according to claim 1 via the port extending through the side wall;

closing the port;

rotating the tumbler drum about an axis of rotation at for a period of time;

flowing sweep gas through the water vapor source to produce humidified sweep gas;

flowing the humidified sweep gas through the tumbling device from a gas inlet to an outlet while the tumbling device is rotating, thereby entraining separated polysilicon powder in the humidified sweep gas; and separating at least a portion of the humidified sweep gas and the entrained polysilicon powder through the outlet from the granular polysilicon.

8. The method of claim 7, wherein the humidified sweep gas has a relative humidity of at least 2%.

9. The method of claim 7, wherein the humidified sweep gas is produced by contacting the sweep gas with water vapor prior to introducing the sweep gas into the chamber.

10. The tumbling device of claim 1, wherein the source of sweep gas is a source of nitrogen, argon, or helium.

* * * * *